United States Patent [19]
Kamei et al.

[11] Patent Number: 4,996,649
[45] Date of Patent: Feb. 26, 1991

[54] IMAGE PROCESSOR CAPABLE OF STORING CHARACTER IMAGES AND GRAPHIC IMAGES IN A MEMORY AND INCLUDING A TIMER FOR ENSURING IMAGE PROCESSING OPERATIONS ARE CARRIED OUT IN A PREDETERMINED TIME PERIOD

[75] Inventors: Nobuo Kamei; Yoshikazu Ikenoue, both of Osaka, Japan

[73] Assignee: Minolta Camera Kabushiki Kaisha, Osaka, Japan

[21] Appl. No.: 230,482

[22] Filed: Aug. 10, 1988

[30] Foreign Application Priority Data

Aug. 11, 1987 [JP] Japan .................................. 62-200308
Sep. 11, 1987 [JP] Japan .................................. 62-228875

[51] Int. Cl.⁵ .............................................. G06F 15/20
[52] U.S. Cl. .................................. 364/518; 346/33 R; 364/521
[58] Field of Search ............... 364/519, 520, 523, 518, 364/521, 200 MS File, 900 MS File; 400/176, 186, 158, 146; 101/93.18, 93.09, 93.13, 93.14; 346/33 R, 154, 160

[56] References Cited

U.S. PATENT DOCUMENTS

| | | | |
|---|---|---|---|
| 4,031,519 | 6/1977 | Findley | 364/900 |
| 4,310,840 | 1/1982 | Williams et al. | 340/724 |
| 4,529,455 | 5/1985 | Crean et al. | 364/900 |
| 4,541,061 | 9/1985 | Schoon | 364/518 |
| 4,616,327 | 10/1986 | Rosewarne et al. | 364/520 |
| 4,648,047 | 3/1987 | Berkland et al. | 364/519 |
| 4,661,812 | 4/1987 | Ikeda | 340/799 |
| 4,675,833 | 6/1987 | Cheek et al. | 364/523 |
| 4,689,766 | 8/1987 | Kent | 364/900 |
| 4,694,405 | 9/1987 | Bradbury et al. | 364/518 |
| 4,698,755 | 10/1987 | Okazaki et al. | 364/519 |
| 4,703,438 | 10/1987 | Nishiyama et al. | 364/519 |
| 4,737,923 | 4/1988 | Matsuzaki et al. | 364/519 |
| 4,745,576 | 5/1988 | Hasegawa et al. | 364/900 |
| 4,769,648 | 9/1988 | Kishino et al. | 364/519 X |
| 4,769,684 | 9/1988 | Kishino et al. | 346/33 R |
| 4,796,203 | 1/1989 | Roberts | 364/521 |
| 4,805,135 | 2/1989 | Ochi et al. | 364/900 |
| 4,811,242 | 3/1989 | Adachi | 364/519 |

Primary Examiner—Gary V. Harkcom
Assistant Examiner—H. R. Herndon
Attorney, Agent, or Firm—Burns, Doane, Swecker & Mathis

[57] ABSTRACT

An image processor including a memory for storing bit images of a graphic pattern or a character, a receiver for receiving information regarding an image to be outputted from an external apparatus, and an image writer for writing bit images on the memory in accordance with the received information. A timer is provided and starts to clock when the image writer begins to write bit images. A control circuit is also provided for forcibly stopping the operation of the image writer if the imaging operation by the image writer has not yet been completed upon the timer reaching or exceeding a predetermined period. The predetermined time period is determined in accordance with the bit images being a graphic pattern or a character.

8 Claims, 6 Drawing Sheets

IMAGE PROCESSOR CAPABLE OF STORING CHARACTER IMAGES AND GRAPHIC IMAGES IN A MEMORY AND INCLUDING A TIMER FOR ENSURING IMAGE PROCESSING OPERATIONS ARE CARRIED OUT IN A PREDETERMINED TIME PERIOD

BACKGROUND OF THE INVENTION

1. Field of the Invention

The present invention relates to an image processor for storing character images and/or graphic images in a memory.

2. Description of the Prior Art

Certain prior art image processors have been utilized for writing bit images in a bit map memory according to data entered from an external data processor. When the image processor completes the imaging of one page of data, bit image data written in the bit map memory is outputted to an external output apparatus such as a printer.

In such an image processor, there is provided a bit map controller for controlling a bit image writer. When parameters for executing the imaging are set to the bit image writer, the imaging operation is automatically executed at the image processor side. The bit map controller decides whether the bit image writer is in the process of imaging or has completed the imaging according to signals outputted from the bit image writer. If it is confirmed that the imaging has been completed, the bit map controller makes the bit image writer write bit images of the next page.

In such a case that each pattern size of bit image is enlarged due to mis-entry of parameters by a user or noises, it takes an abnormally long time to write bit images. In a conventional image processor, time loss due to the error may be negligible since the pattern size defined on the bit map memory is small from the beginning because of a low resolution of the image. Accordingly, it is unnecessary for the bit map controller to decide and proceed with the misoperation of the bit image writer.

However, according to a recent image processor having a high resolution of the image, the pattern size to be defined on the bit map memory becomes necessarily large.

Accordingly, it becomes difficult to neglect the time loss in imaging bit images due to an abnormal pattern size caused by the troubles noted supra. In order to avoid this problem, it becomes necessary to detect such an abnormal state in imaging and to stop the operation of the bit map writer if problems are detected.

SUMMARY OF THE INVENTION

An essential object of the present invention is to provide an image processor which is capable of minimizing the time loss in imaging bit images which may be caused by an abnormally large pattern size due to mis-entry of parameters or associated noises.

Another object of the present invention is to provide an image processor which is capable of forcibly suspending the operation of a bit image writer when a predetermined period of time has elapsed before the completion of imaging.

In order to achieve these objects, according to the present invention, there is provided an image processor comprising a memory unit for storing bit images, a unit for receiving information regarding an image to be outputted form an external apparatus, an imaging unit for writing bit images into said memory unit in accordance with the received information, a timer unit which starts to clock when the imaging unit begins to write bit images, and a control unit for forcibly stopping the operation of the imaging unit if the imaging operation by the imaging unit has not yet been completed at a predetermined time of the timer unit.

BRIEF DESCRIPTION OF DRAWINGS

These and other objects and features of the present invention will become more apparent when the preferred embodiment of the present invention is described in detail with reference to the accompanied drawings in that.

DETAILED DESCRIPTION OF THE PREFERRED EMBODIMENT

Figure 1:
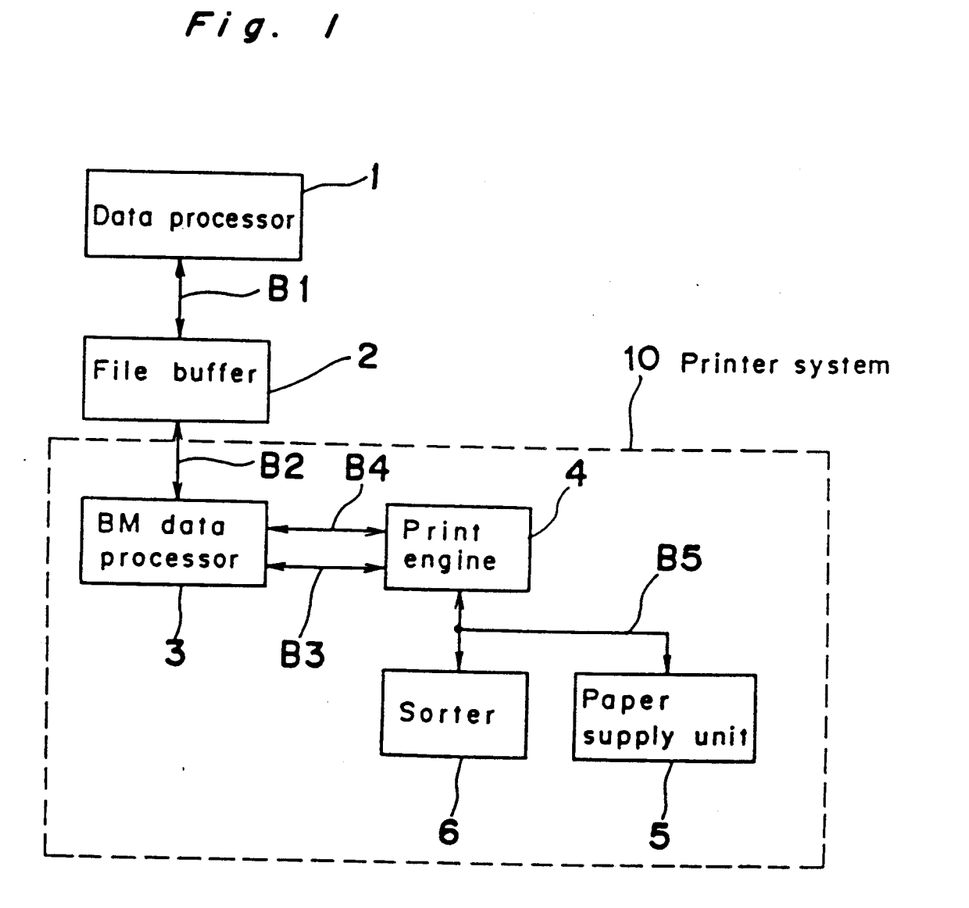
FIG. 1 is a block diagram of a printer system to which the present invention is applied.

FIG. 1 shows a data processing system including a printer system 10 to which the present invention is applied.

Data sent from an external data processor 1 such as a host computer is stored in a file buffer 2 in order to improve the data throughput of the external data processor 1 and, thereafter, is outputted from the file buffer 2 to the printer system 10.

The printer system 10 is comprised of a data processor 3 of bit map type, a print engine 4 including an electro-photographic processor and a laser unit (not shown) and accessories such as an external paper supplying unit 5 and a sorter 6.

Figure 2:
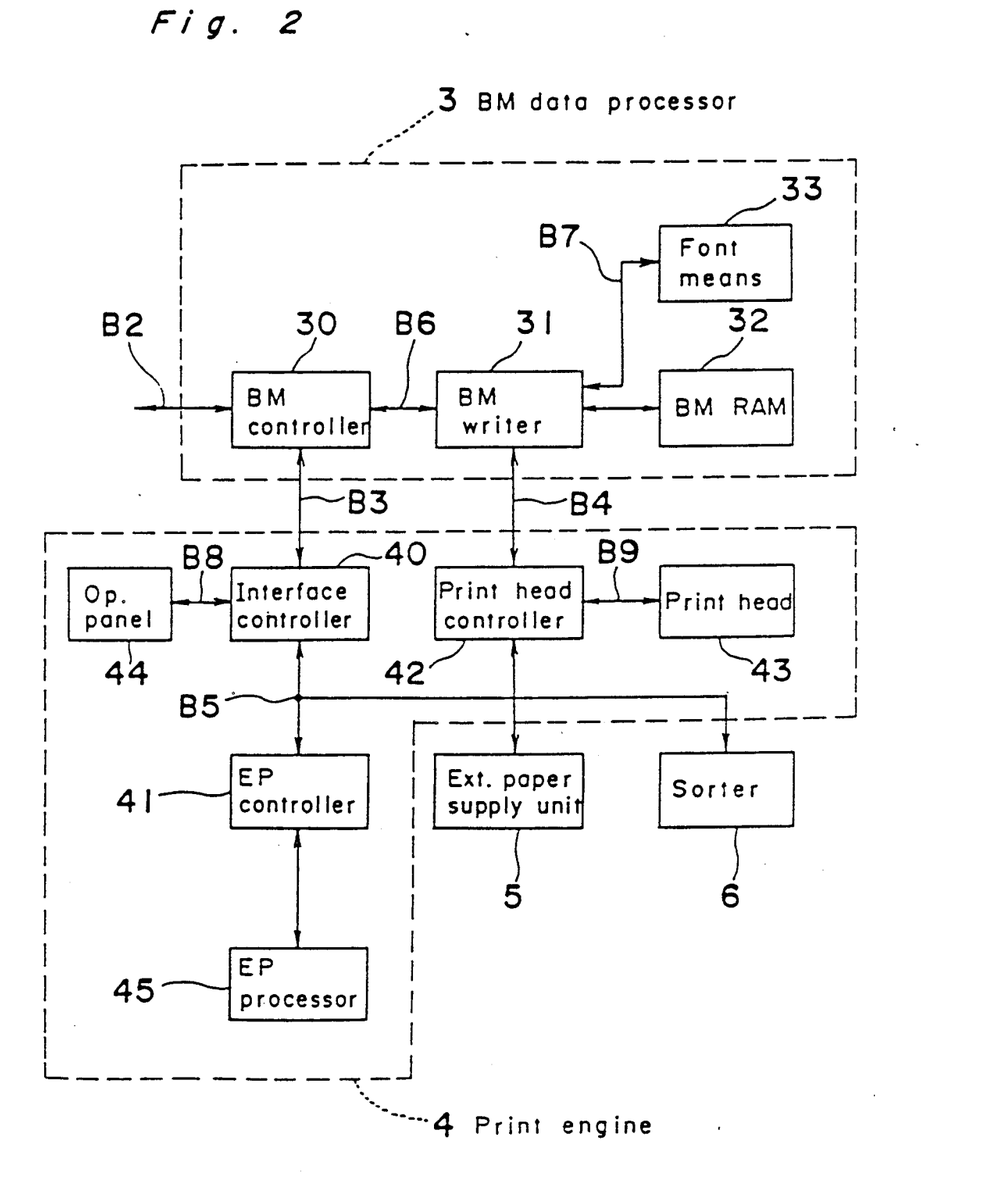
FIG. 2 is a block diagram showing compositions of the bit map data processor and print engine shown in FIG. 1.

FIG. 2 is a block diagram of the printer system 10.

The data processor 3 of the bit map type is comprised of a bit map controller 30 (See FIG. 3) for writing bit images in BM-RAM 32 and a font memory 33 for giving font pattern data upon writing character images.

The data processor 3 communicates with the print engine 4 through a bus B3 in order to transmit control data such as a number of prints and/or data for controlling accessories, and a bus B4 for image data.

The print engine 4 comprises three controllers: an interface controller 40, an electro-photographic controller 41 and a print head controller 42.

The interface controller 40 executes processing for the control data from the bit map controller 30, control of an operation panel 44 and timing control for the printer 4 through an internal bus B8. The electro-photographic controller 41 (See FIG. 8) controls the electro-photographic processor 45 in accordance with data sent, via the internal bus B5, from the interface controller 40. The print head controller 42, as shown in FIG. 9, drives and controls a semiconductor laser 431 and a polygon motor 432 provided in the print head 43 in order to form a latent image on a photoconductive drum (not shown) in accordance with image data sent from the bit map writer 31 through the internal bus B4 and control data sent from the interface controller 40 through the internal bus B5.

The external paper supplying unit 5 and the sorter 6 are also controlled by the interface controller 40 through the internal bus B5.

Figure 3:
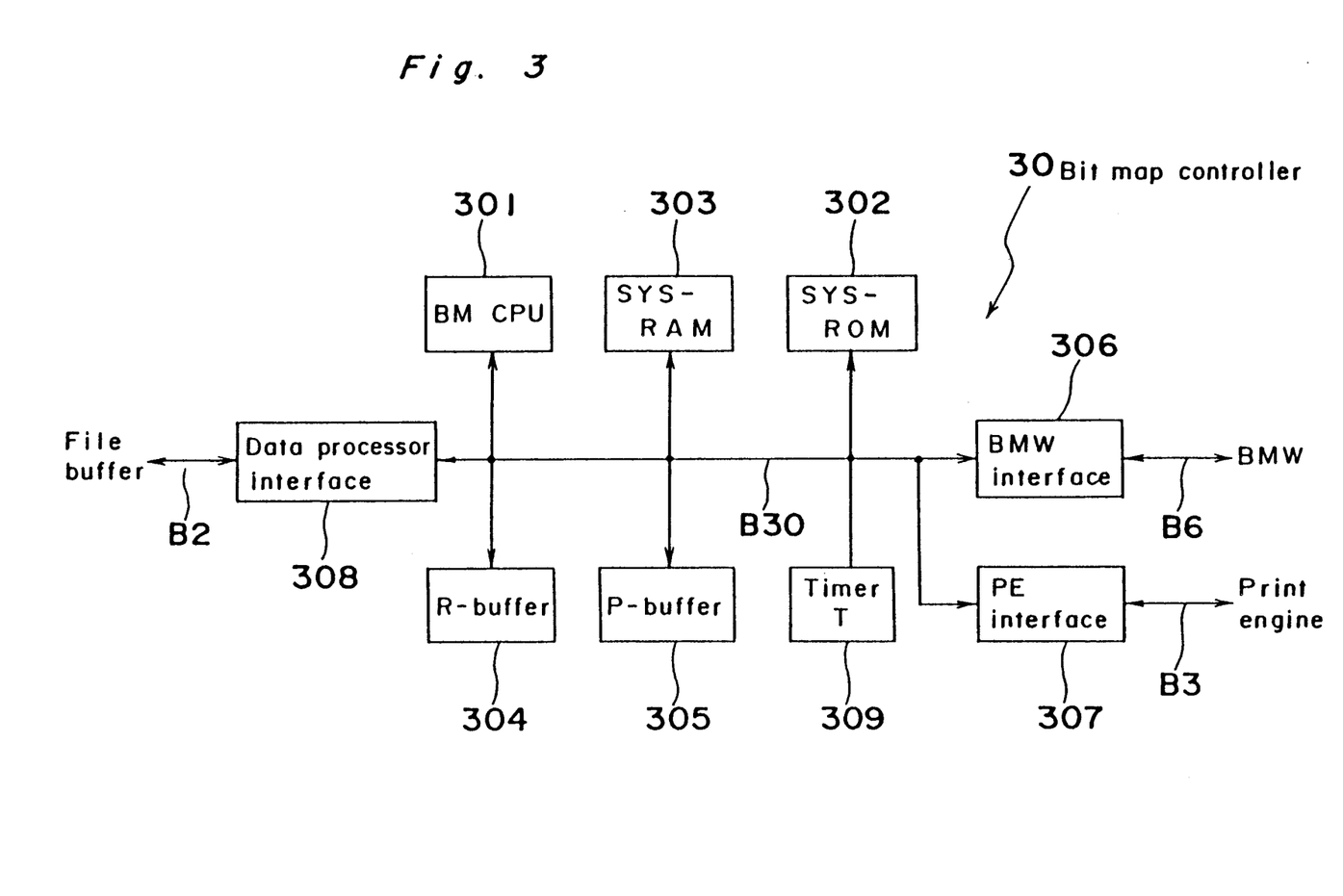
FIG. 3 is a block diagram of the bit map controller shown in FIG. 2.

FIG. 3 is a block diagram of the bit map controller 30.

The bit map controller 30 is comprised of several units interconnected by an internal bus B301. BM-CPU 301 is a main control unit in the data processor 3 of the bit map type. It communicates with the external data processor 1 and file buffer 2 through an interface 308 provided therefor, transforms print data, controls the bit map writer 31 through a bit map writer interface 306, and controls the print engine 4 through a print engine interface 307. A system ROM (SYS-ROM) 302 is provided for memorizing programs to be executed by BM-CPU 301. Also, a system RAM (SYS-RAM) 303 is provided as a working memory area for BM-CPU 301 and is used for storing various stacks and flags.

A register buffer (R-buffer) 304 is a buffer for communication with the external data processor 1 and is provided for temporarily storing data received from the external data processor 1 for asynchronous control.

A packet RAM (P-RAM) 305 is provided for storing intermediate codes having been transformed from image data sent from the external data processor 1. This transformation into intermediate codes is done to make the transformation of image data into bit images faster.

A print engine interface 307 is an interface between the bit map controller 30 and the print engine 4 and communicates JOB information such as a number of prints and JOB control commands such as a print command and the like with an interface (not shown) of the print engine 4 through the bus B3.

Further, a timer 309 is provided for clocking a predetermined period of time T and is controlled to start the clocking by BM-CPU 301.

Figure 4:
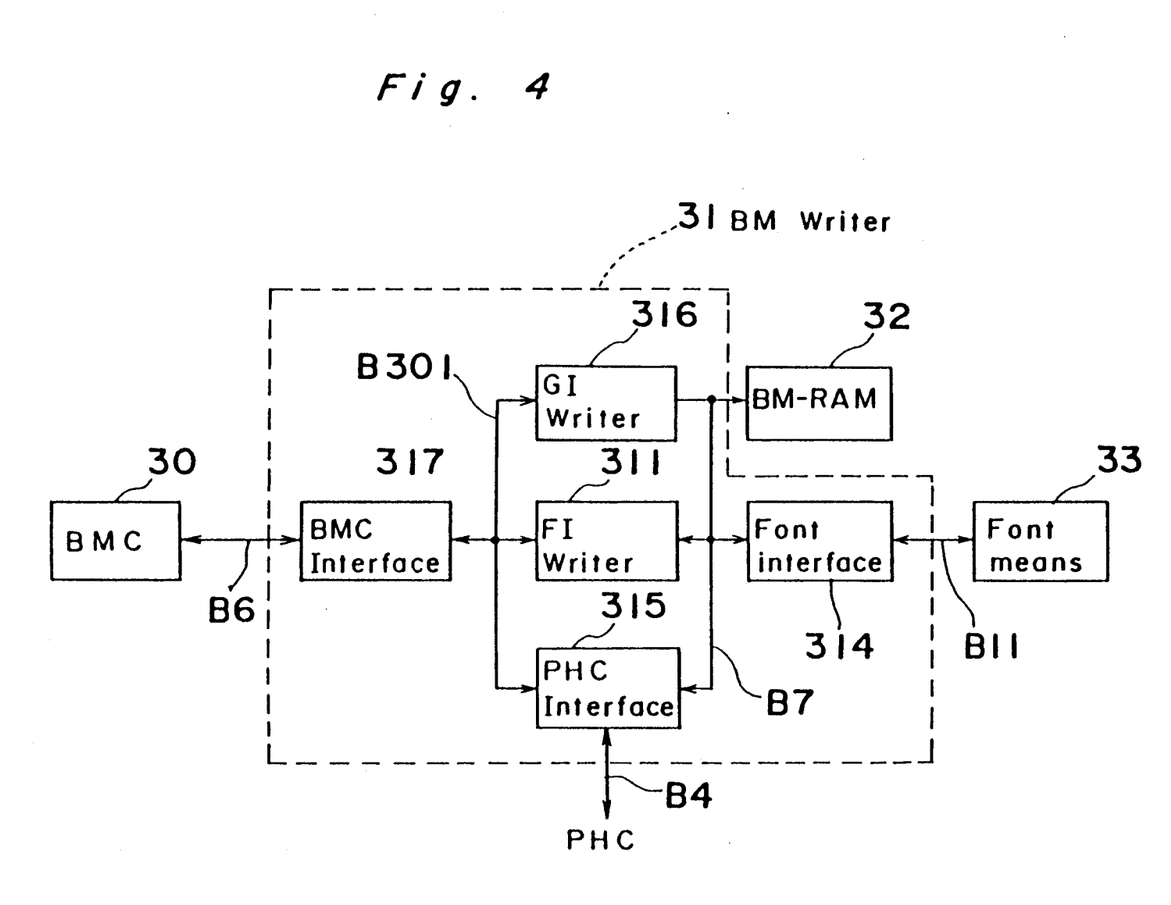
FIG. 4 is a block diagram of the bit map (image) writer shown in FIG. 2.

FIG. 4 is a block diagram of the bit map writer 31.

The bit map writer 31 has an imaging function for writing bit images into BM-RAM 32 and an output function for outputting bit images of BM-RAM 32 to the print engine 4.

The imaging function is further divided into a function for imaging graphic images such as lines and circles to be performed by a graphic image writer 316 and a function for imaging character images to be performed by a font image writer 311.

The graphic image writer 316 analyzes parameters contained in intermediate codes and writes graphic images on BM-RAM 32 in accordance with the result of the analysis.

On the contrary, the font image writer 311 reads font patterns (character patterns) from the font memory means 33 through a font memory means interface 314 in accordance with character data contained in intermediate codes and writes character patterns (bit images) into BM-RAM 32.

The data output function upon printing is performed by a print head controller (PHC) interface 315. Specifically, when PHC interface 315 receives a PRINT START code sent from the bit map controller 30 through the bit map controller interface 317, it outputs bit image data of BM-RAM 32 to the print head controller 42 in accordance with synchronizing signals sent from the print head controller 42 of the print engine 4 through the bus B4.

Figure 5:
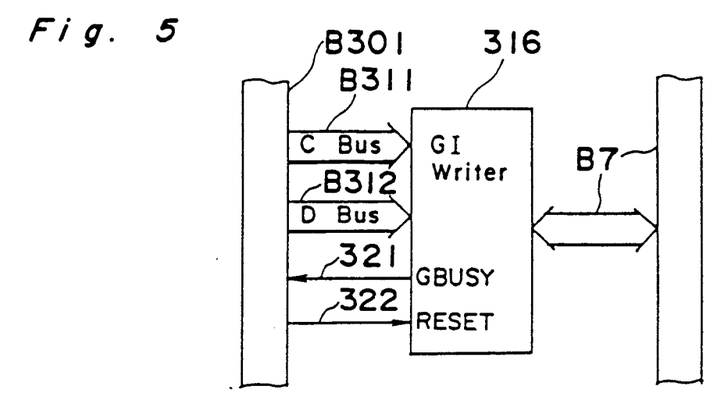
FIG. 5 is a block diagram of the graphic image writer shown in FIG. 4.

FIG. 5 shows a composition of the graphic image writer 316.

The graphic image writer 316 is controlled by BM-CPU 301 through buses B301 and B311 and acts in accordance with intermediate codes read from P-RAM 305 through a bus B312. When intermediate codes have been set by BM-CPU 301, it outputs GBUSY signal through a signal line 321 which indicates that graphic images are being written and writes graphic images on BM-RAM 32 through a bus B7 by analyzing parameters contained in the intermediate code having been set. After completion of imaging, graphic image writer 316 makes the GBUSY signal inactive to indicate the completion of imaging to BM-CPU 301. RESET signal is a signal to be input from BM-CPU 301 through a signal line 322 if the imaging is not completed in a predetermined period of time and, when applied to the graphic image writer 316, the latter is initialized internally to stop the imaging of graphic images.

Figure 6:
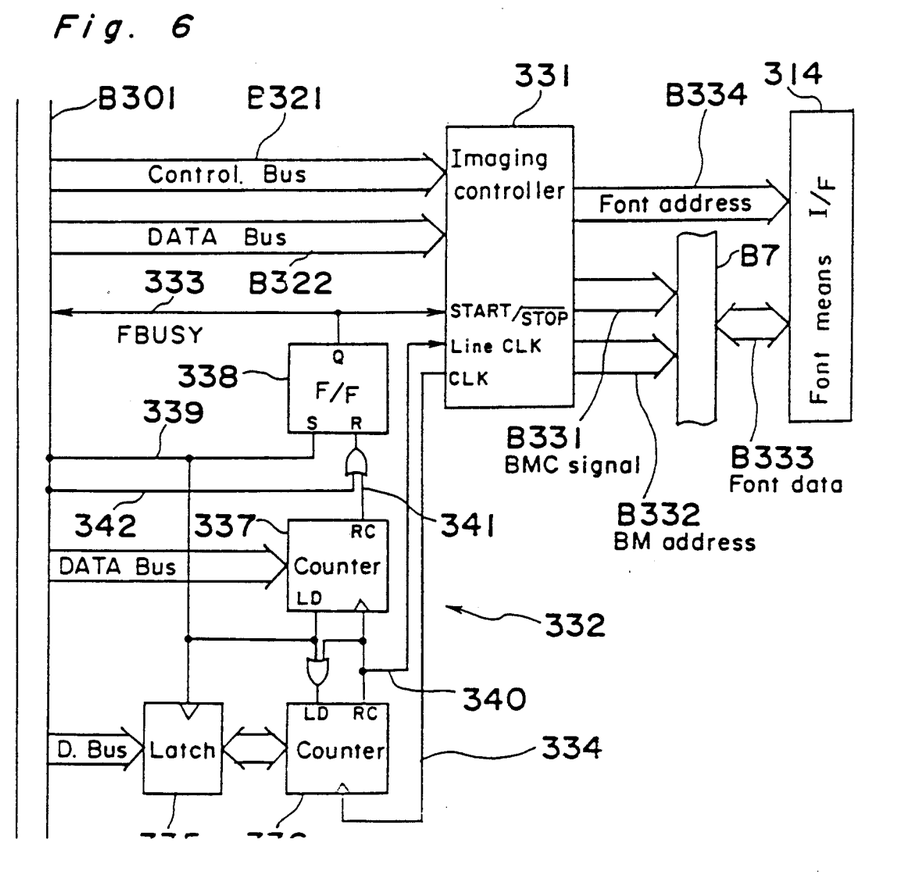
FIG. 6 is a block diagram of the font image writer shown in FIG. 4.

FIG. 6 shows a composition of the font image writer 311.

The font image writer 311 acts according to data contained in intermediate codes which are read from P-RAM 305 and set by BM-CPU 301. When the top address of a character pattern and the top write address for BM-RAM 32, the writing mode, the width of character and the height of character for writing characters into BM-RAM 32 are set by BM-CPU 301, it images characters referring to character pattern data in accordance with those values having been set by BM-CPU 301.

The font image writer 311 is comprised of an imaging controller 331 for writing each character bit image in BM-RAM 32 by calculating a character pattern address of the font memory 33 and a writing address for BM-RAM 32 corresponding to a character data to be imaged and a count unit 332 for counting the pattern size of each character pattern data.

When the top address of a character pattern data, the top write address for BM-RAM 32 and the writing mode are set by BM-CPU 301 through buses B301, B321 and B322, respectively, and if FBUSY signal on a signal line 333 indicating the status of in-imaging becomes "high", the font image writer 311 starts to image a character pattern in BM-RAM 32. Further, font image writer 311 calculates a character pattern address and a write address for BM-RAM 32 corresponding to the next character data after the completion of imaging the present character pattern in BM-RAM 32 and outputs those values to a font memory interface 314 via buses B331, B332, B333 and B334. At the same time, it outputs a CLK signal indicating the completion of imaging one bit image through a signal line 334. The imaging operation by the imaging controller 331 is continued until FBUSY signal becomes "low".

The count unit 332 for counting the pattern size of each character pattern is comprised of a latch 335 for storing the width of character, a counter 336 for counting it, a counter 337 for counting the height of character and a flip-flop 338 for outputting FBUSY signal indicating "in imaging" or "completion of imaging". The count means 332 sets the width of the character to the counter 336 and the height of character to the counter 337 and the latch 335 via a signal line 339 according to a signal for setting the pattern size and, at the same time, starts the action of the imaging controller 331 by setting the flip-flop 338 to make FBUSY signal "high". The counter 336 counts the CLK signal through a signal line which is outputted by the imaging controller 331 at every completion of imaging of one data.

When the counting is completed, the counter 336 outputs RIPPLE CARRY signal indicating the completion of writing of one line data through a signal line 340 and, at the same time, reloads the value of the width of character having been set in the latch 335.

The counter 337 counts the RIPPLE CARRY signal.

This RIPPLE CARRY signal is also outputted to the imaging controller 331 in order to facilitate the calculation of the write address of BM-RAM 32. When the counter 337 counts up the height of the character, another RIPPLE CARRY signal indicating the completion of counting of the pattern size of one character is outputted to the flip-flop 338 through a signal line 341 to reset the latter. When the flip-flop 338 is reset, FBUSY signal becomes "low" in order to inform the completion of imaging of one character to BM-CPU 301 and to stop the action of the imaging controller 331.

If the imaging of one character has not been completed in a predetermined period of time, BM-CPU 301 outputs a RESET signal through a signal line 342 in order to reset the flip-flop 338. Due to the generation of this RESET signal, FBUSY signal becomes "low" and, therefore, the font image writer 311 is forcibly stopped.

Figure 7:
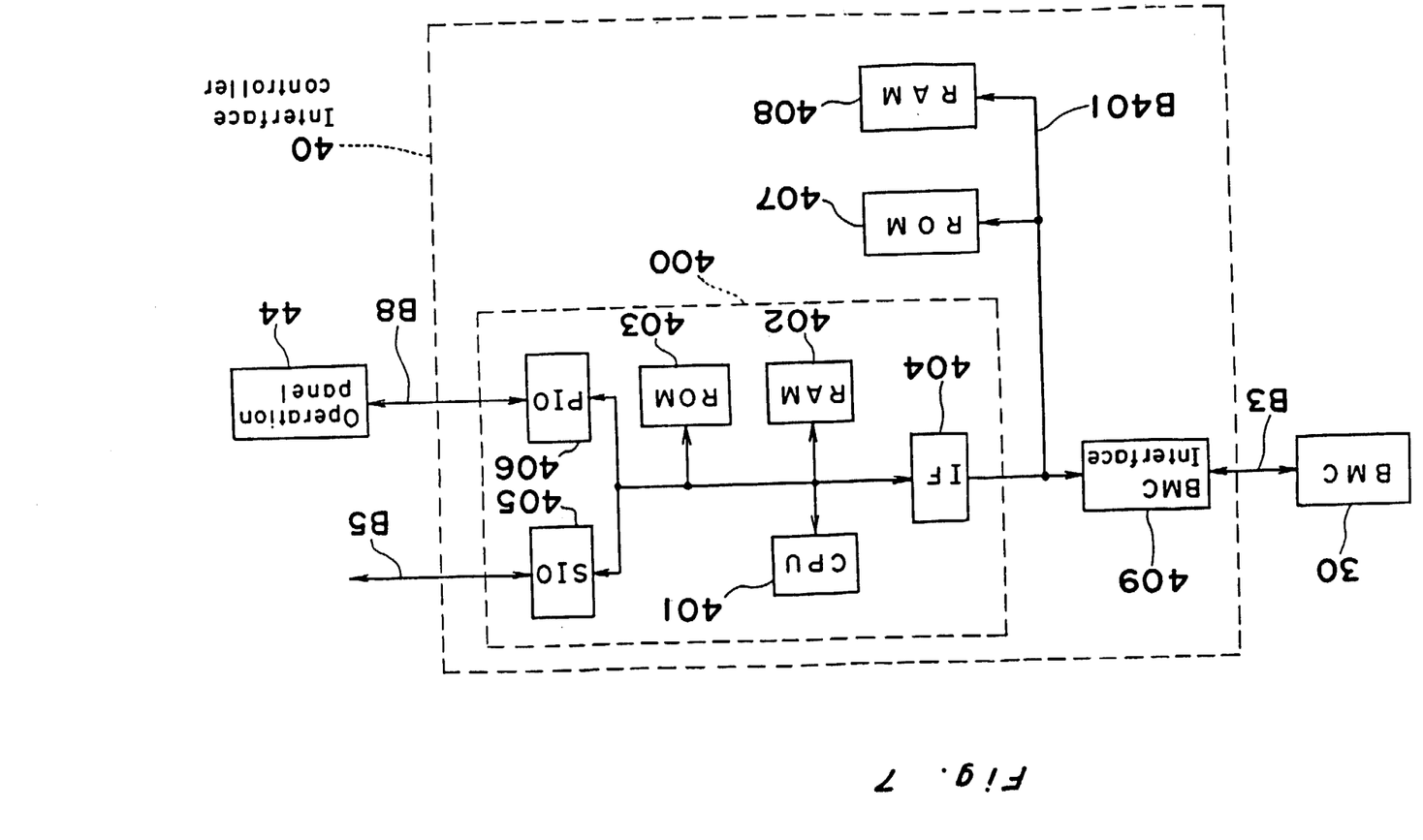
FIG. 7 is a block diagram of the interface controller shown in FIG. 2.

FIG. 7 shows a configuration of the interface controller 40 the print engine 4.

The interface controller 40 provides IFC-CPU 400 as a main component which is comprised of a one-tip microcomputer. Externally mountable ROM 407, RAM 408, and interface 409 for the bit map controller 30 are connected, via a bus B401 expanded by an interface 404 of IFC-CPU 400, to the interface controller 40. ROM 407 is interchangeable by a socket and programs proper for the purpose of use are stored therein while standard programs are stored in the masked ROM 403 in IFC-CPU 400.

In IFC-CPU 400, a serial input/output circuit (SIO) 405 and a parallel input/output circuit (PIO) 406 are provided as well as CPU 401 and RAM 402. SIO 405 controls the bus B5 for controlling the electro-photographic controller 41 and the print head controller 42. PIO 406 is used for controlling the operation panel 44.

Figure 8:
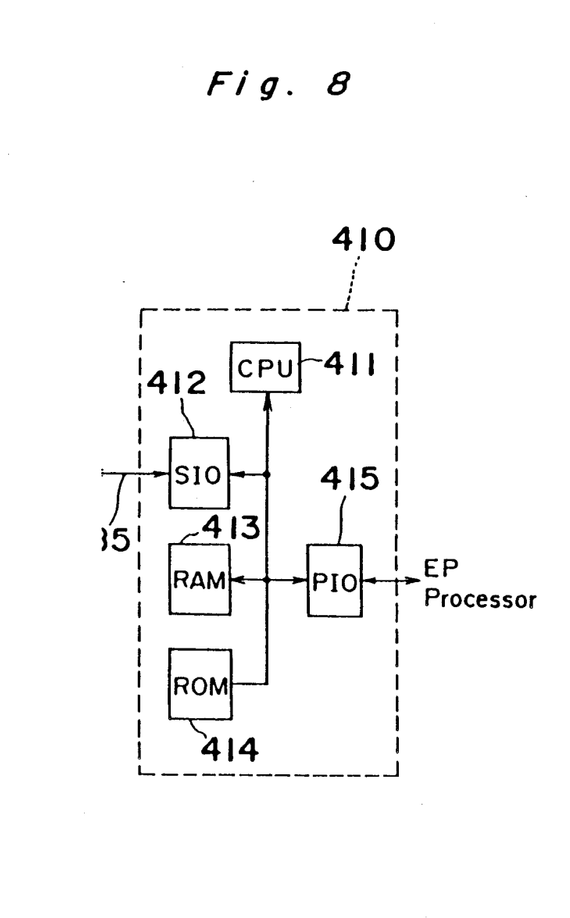
FIG. 8 is a block diagram of the electrophotographic processor shown in FIG. 2.
Figure 9:
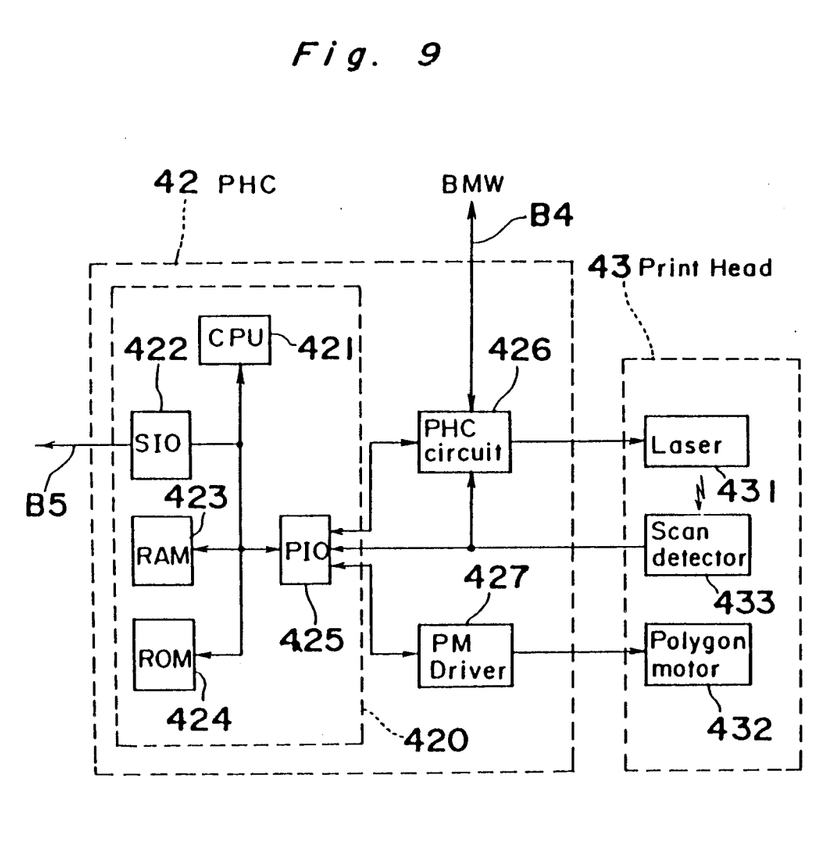
FIG. 9 is a block diagram showing compositions of the print head controller, and print head shown in FIG. 2.

FIG. 8 is a configuration of the electro-photographic controller 41.

The electro-photographic controller 41 is controlled by MC-CPU 410 comprised of a one-tip microcomputer. RAM 413 and ROM 414 are connected thereto. The electro-photographic controller 41 is not expandable by an externally mountable ROM, specifically, it has only standard programs stored therein. A serial input/output circuit (SIO) 412 communicates with the interface controller 40 through the bus B5. A parallel input/output circuit (PIO) 415 is used for inputting and outputting data regarding the process control.

FIG. 9 is a block diagram showing a configuration of the print head controller 42.

The print head controller 42 controls the rotation of a polygon motor 432 provided in the print head 43 in accordance with data sent, via the bus B5, from the interface controller 40 and, also, drives a semiconductor laser diode 431 in accordance with image data sent from the bit map data processor 3 via the bus B4 in synchronous with signals from a scan detector (SOS) 433 for detecting a scan by the laser.

The print head controller 42 is substantially comprised of a microcomputer PHC-CPU 420 of one-tip type and a serial input/output circuit (SIO) 422 thereof is connected to the bus B5 for communicating with the interface controller 40. A driver 427 for driving the polygon motor 432, the scan detector 433 and a print head control circuit 426 for driving the semiconductor laser 431 according to image data sent from the bit map data processor 3 are connected to a parallel input/output circuit (PIO) 425.

Since image data sent through the bus B4 is parallel data, the print head control circuit 426 executes parallel to serial conversion of image data in order to drive the semiconductor laser 431. Further, PHC circuit 426 generates timing signals for synchronizing the transmission of image data against the print head controller interface 315 of the bit map writer 31.

Next, the functions of the printer system will be explained referring to flow charts shown in FIGS. 10(a), 10(b), 11 and 12.

Figure 10A:
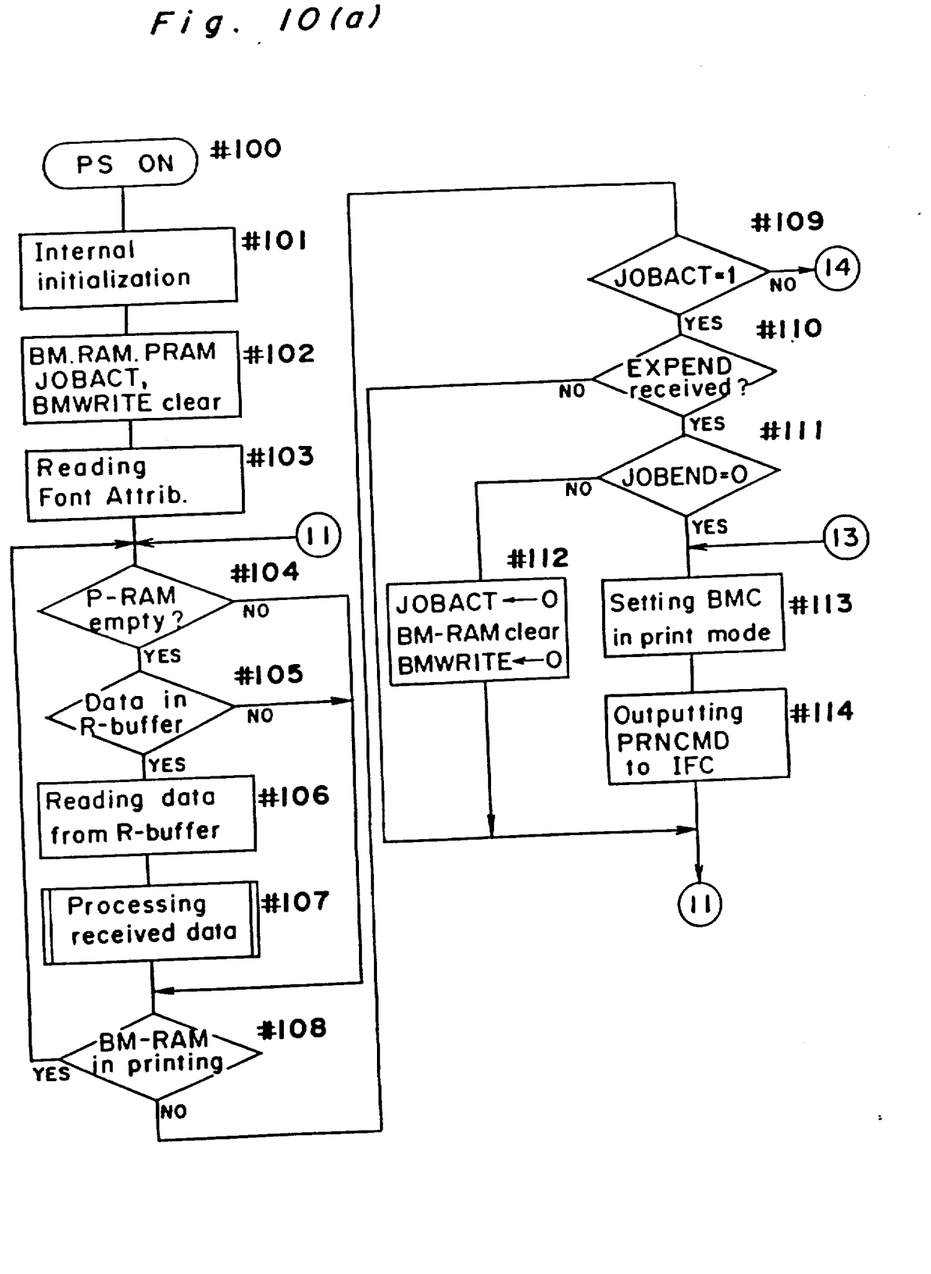
FIGS. 10(a) and 10(b) show a flow chart of the main routine to be executed by the bit map controller.
Figure 10B:
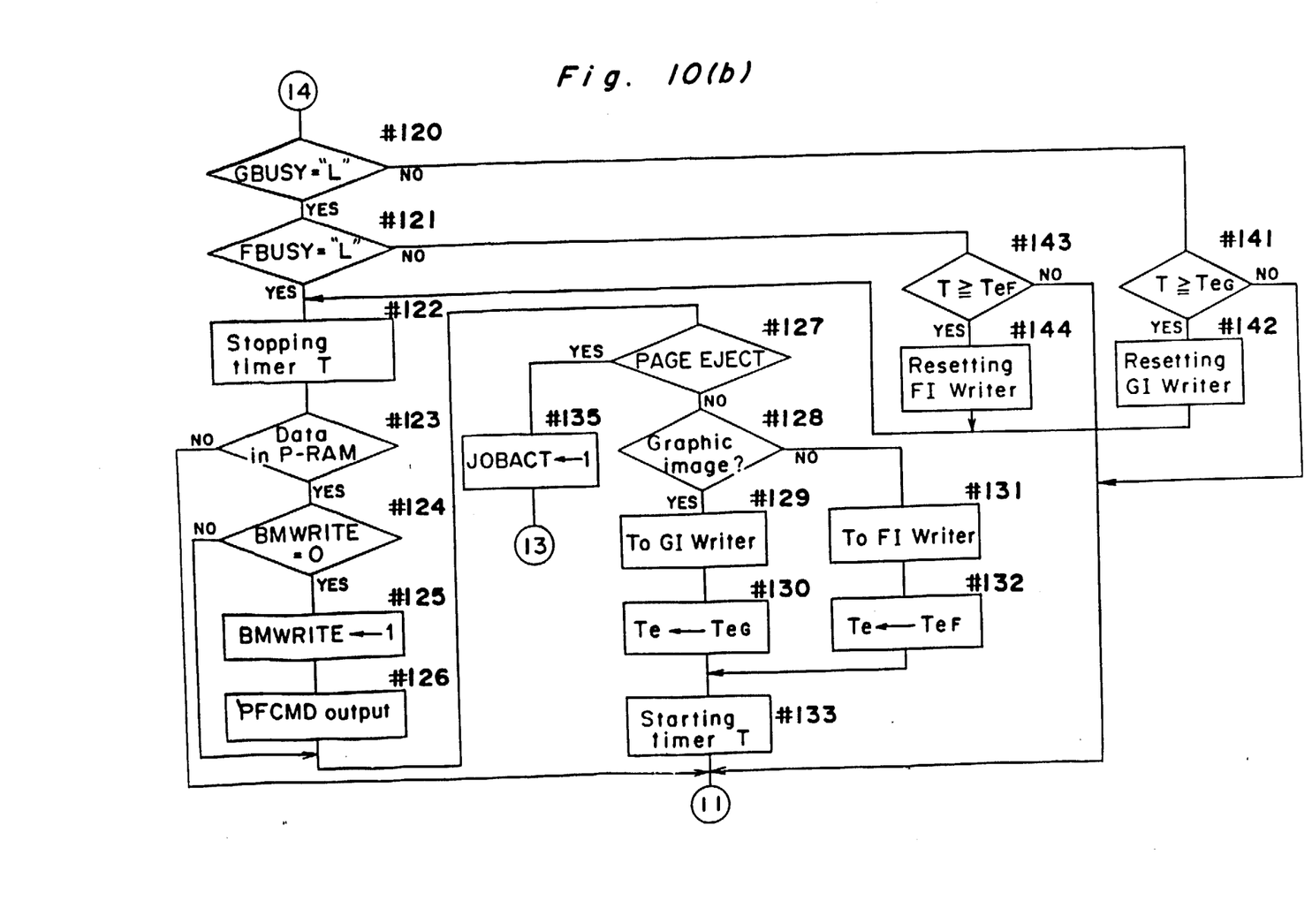

FIGS. 10(a) and 10(b) show a flow chart of the main routine to be executed by the bit map controller 30.

When the power source for the printer is switched on at step #100, internal initialization of the printer including reset of the timer T 309 is performed at step #101. Then, at step #102, BM-RAM 32 for storing bit images to be printed and P-RAM 305 for storing intermediate codes (packet data) are cleared, and a JOB ACT flag indicating "in printing" and a BM-WRITE flag indicating "in writing into BM-RAM" are reset. Thereafter, attributes of the designated font are read from the font memory means 33 at step #103.

The process then enters into the received data processing loop. In this loop, received data is processed at first.

First, it is determined at step #104 whether there is an empty area in R-RAM 305. If there is an empty area, data temporarily stored in R-buffer 304 according to an interruption routine shown in FIG. 12 is accessed at steps #105 and #106 and processed by the subroutine #107 for processing received data (see FIG. 11).

Figure 11:
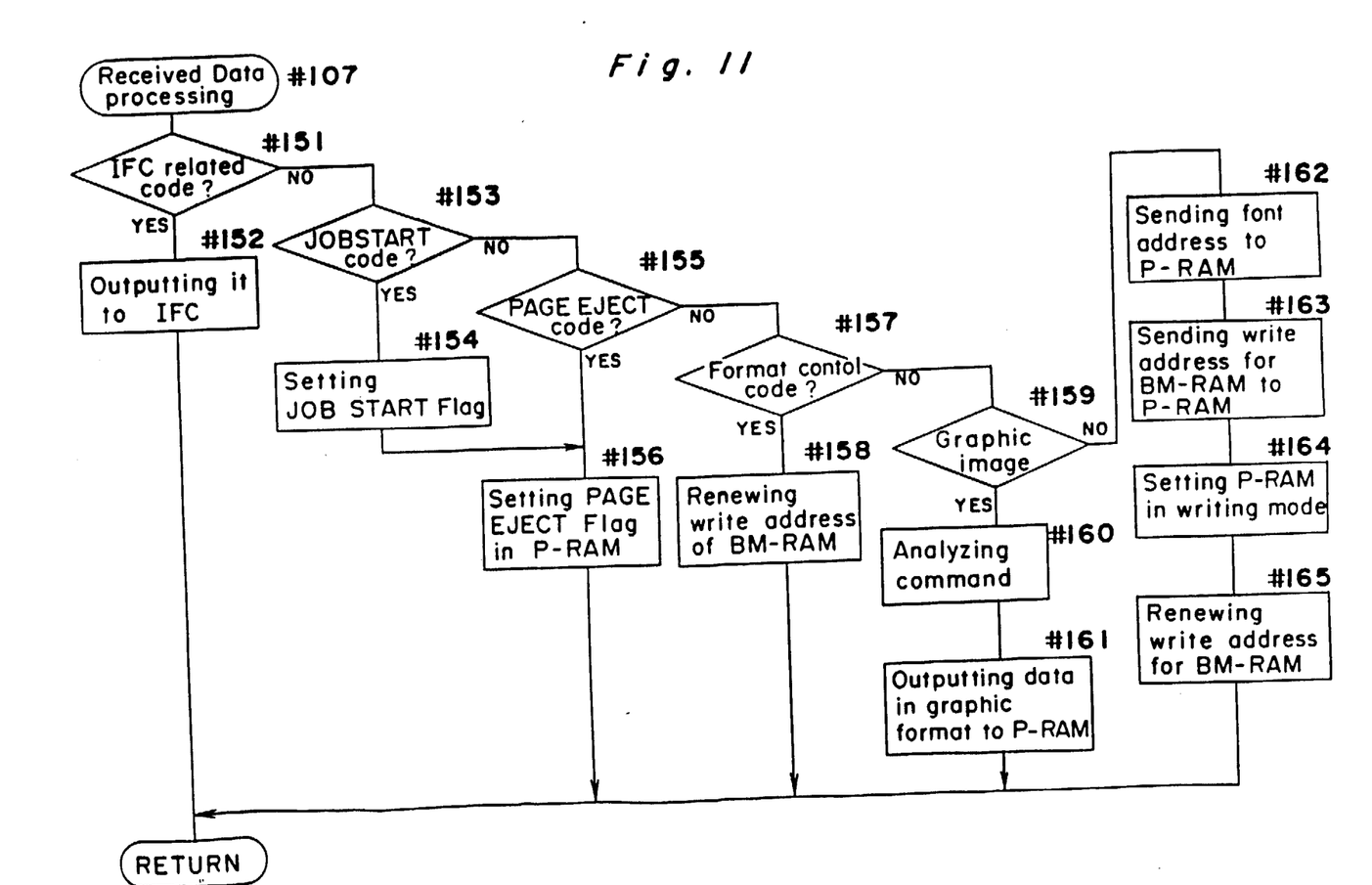
FIG. 11 is a flow chart of the subroutine for processing received data.
Figure 12:
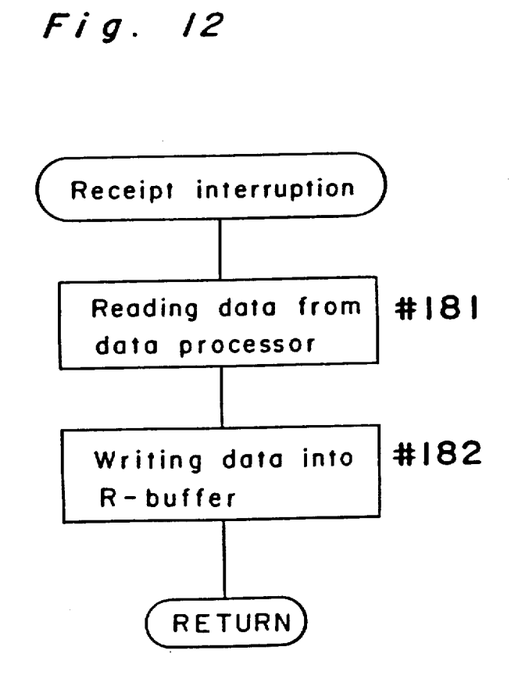
FIG. 12 is a flow chart of an interruption subroutine to be executed upon receiving data.

FIG. 11 is a flow chart of the subroutine #107.

Data sent from the external data processor 1 includes four kinds of codes, specifically a code related to the print engine (IFC related code), a JOB CONTROL code, a FORMAT CONTROL code and a PRINT CODE. Among them, IFC related code is outputted to the interface controller 40 at steps #151 and #152. The JOB CONTROL code includes a PAGE EJECT code indicating the end of a page and JOB START code indicating the start of a JOB (a lump of pages). If the data is the JOB START code at step #153, a flag corresponding thereto is set at step #154. If it is the PAGE EJECT code at step #155, a flag corresponding thereto is set at step #156. These flags are stored in P-RAM 305, respectively.

If the data is the FORMAT CONTROL code at step #157, the write address of BM-RAM 32 is renewed for the next character at step #158.

If the data is GRAPHIC COMMAND code data at step #159, parameters contained therein are analyzed at step #160 and the results of the analysis are outputted to P-RAM 305 in the graphic format at step #161.

Codes other than the codes mentioned above are deemed as character codes. Each character code is transformed into an intermediate code to output it to the bit map writer 31 and the intermediate code is written in P-RAM 305. Each intermediate code is comprised of an address of the font memory corresponding to the character, a write address for BM-RAM 32 and a mode signal for setting P-RAM in a write mode. These data rewritten into BM-RAM 32 at steps #162, #163 and #164, respectively. Thereafter, the write address is renewed to write the next bit character image in BM-RAM 32 according to the character size of the present bit character image at step #165. However, if the data is GRAPHIC COMMAND CODE, the write address to BM-RAM 32 is not renewed.

Now, returning to FIG. 10(a), it is checked at step #108 whether BM-RAM 32 is currently being used for printing or not.

If it is NO at step #108 and the printer is not in multi-printing (NO at step #109), the process advances to steps #120 and #121 of FIG. 10(b) in order to check whether a graphic image or a character image is being imaged or not.

If the bit map controller 30 is in imaging, namely GBUSY is "high" (NO at step #120) or FBUSY is "high" (NO at step #121), it is checked whether the imaging time needed for imaging the latest bit graphic or character image is abnormally long or not, at step #141 or #143.

As stated above, it is prohibited to image or write the next bit image during imaging the latest bit image. Accordingly, if the imaging time becomes abnormally long due to mis-setting of parameters or noises, it will result in a time loss in imaging.

The timer T 309 is used to detect the abnormal imaging time. If the value Te of time period to be set to the timer 309 is constant, some inconveniences are caused as follows.

Specifically, if Te is determined so as to correspond to the normal bit image size of character which is relatively small when compared with that of graphic pattern, the imaging time regarding an ordinal graphic pattern is detected to be abnormal.

On the contrary, if Te is determined so as to correspond to the normal size of graphic pattern, it becomes difficult to detect abnormality in imaging a character bit image.

In order to avoid these problems, the value Te is made variable according to data regarding the kinds of the bit image and the imaging method. In other words, Te is set at $Te_G$ in the case of the graphic bit image and set at $Te_F$ in the case of the character bit image. These values of $Te_G$ and $Te_F$ are determined so as to be able to reduce the time loss in imaging the graphic bit image and the character bit image, respectively. As is clear from the mentioned above, $Te_G$ is set at a value larger than $Te_F$.

The timer T 309 is started after a graphic bit image or character bit image has been outputted to the bit map writer 31 (See steps #129, #131 and #133 of FIG. 10(b)).

In the case that the latest graphic image is being imaged (NO at step #120), if the time internal counted by the timer T 309 is equal to or exceeds $Te_G$ at step #141, the graphic image writer 31 is reset at step #142.

Similarly, if the time interval counted by the timer T 309 is equal to or exceeds $Te_F$ in the case of the character image at step #143, the font image writer 311 is reset at step #144.

Then, the timer T 309 is reset at step #122.

If the bit map writer 31 is not in imaging, specifically both signals of GBUSY and FBUSY are "low", the timer T 309 is stopped (reset) at step #122.

If there is data in p-RAM 305 at step #123, BMWRITE flag is checked at step #124 in order to decide whether the data is the first one or not. If BMWRITE flag is not zero, specifically, the data is not the first one and if the PAGE EJECT flag is not set at one (step #127), a graphic or character bit image is outputted to the graphic image writer 316 or the font (character) image writer 311 at step #129 or #131.

Thereafter, the value Te of the timer T 309 is set at $Te_G$ or $Te_F$ according to the kind of data to be imaged, specifically a graphic image or a character image at step #130 or #132 and, at step #133, the timer T 309 is started.

If the data to be imaged is the first one (BM-WRITE flag=0 at step #124), BM-WRITE flag is set to "1" at step #125, and PFCMD for requesting to pre-feed a paper is outputted at step #126. This pre-feeding of paper enables the print head to start exposure of an image of a page to the photoconductive drum by the semiconductor laser as soon as the preparation of print by the bit map data processor 3 has been completed.

Intermediate code data of P-RAM 305 is outputted to the bit map writer 31 serially as far as it exists therein. If the PAGE EJECT code is detected at step #127, the printing operation is started since this indicates that the data transmission of one page has been completed.

In order for that, the JOBACT flag is set to "1" to prohibit the renewal of BM-RAM 32 at step #135. Then, the process returns to step #113 to FIG. 10(a) in order to bring the print head controller interface 315 into the enable state for printing and, thereafter, PRNCMD for requesting the print operation is outputted to the interface controller 40 at step #114.

According to PRNCMD, the print head controller interface 315 outputs bit images of BM-RAM 3 to the print head controller 42 through the bus B4 in synchronous with pulses sent from the control circuit 426 of the print head controller 42.

During the printing operation, the printing loop comprised of steps from #104 to #108 is repeated.

When the printing operation has been completed (NO at step #108), the process advances from step #109 to step #110 since the JOBACT flag has been kept at "1" and waits for EXPEND command indicating the completion of exposure. The control of the number of prints is executed by the interface controller 40 in the case of multi-print.

When the EXPEND command is outputted from the interface controller 40 at step #110 and if JOBEND flag as a parameter of the command has been set at step #111, JOBACT flag and BMWRITE flag are reset and BM-RAM 32 is cleared in order to prepare the print of the next page at step #112.

If the multi-printing operation has not yet been completed at step #111, the printing operation is started with use of the same data of BM-RAM at steps #113, #114 and #104 to #108.

FIG. 12 shows a flow chart of the interruption routine to be executed when data is transmitted from the external data processor.

When the interruption is requested, data is read from the file buffer 2 at step #181 and is written into R-buffer 304 of the bit map controller 30 at step #182.

As is apparent from the mentioned above, the possible time loss can be minimized according to respective kinds of bit image data even if mis-operation is caused due to noises or mis-entry or parameters.

Accordingly, undesirable affections to remaining page can be minimized. Also, if the printer is utilized by plural external data processors, affections to other users can be also minimized.

The preferred embodiments described herein are illustrative and not restrictive, the scope of the invention being indicated by the appended claims and all variations which come within the meanings of the claims are intended to be embraced herein.

What is claimed is:

1. An image processor which receives data indicating particular characters and/or graphic patterns and which converts the data into bit images of actual dot patterns to be outputted to an external apparatus, comprising:

memory means for storing said bit images;
   imaging means for conducting an imaging operation in which the received data is converted into bit images and for writing the converted bit images into said memory means;
   timer means for clocking a predetermined time period from a time when said imaging operation is started; and
   control means for forcibly stopping the imaging operation of said imaging means if the imaging operation has not yet been completed at a time when said timer means reaches or exceeds said predetermined time period.

2. An image processor as claimed in claim 1, further comprising means for setting the predetermined time period to be clocked by said timer means in accordance with a particular type of bit image to be written in said memory means.

3. An image processor as claimed in claim 2, wherein said time period is determined according to whether the type of said bit image to be written in said memory means is a graphic pattern or a character.

4. An image processor as claimed in claim 1, wherein said imaging means comprises:

a font memory in which respective bit images of characters are stored and from which a particular bit image is read according to the received data, and
   a character imaging means for reading said bit image of a character from said font memory according to the received data and for writing said bit image of a character into said memory means.

5. An image processor as claimed in claim 4, wherein said timer means is started every time the imaging operation of one character is started.

6. An image processor as claimed in claim 4, wherein said imaging means further comprises graphic imaging means for forming a graphic bit image on said memory means according to the received data which indicate a graphic pattern.

7. An image processing method comprising the steps of:

receiving data which indicate particular characters and graphic patterns and which will be converted into bit images of actual dot patterns to be outputted to an external apparatus;
   conducting an image operation in which the received data is converted into bit images;
   writing said converted bit images into a memory;
   timing a predetermined time period from a time when said imaging operation is started; and
   stopping the imaging operation if the imaging operation has not yet been completed at a time when a predetermined time period is achieved.

8. An image processing method as claimed in claim 7, further comprising the step of setting the predetermined time period at a first value when the bit images correspond to a graphic pattern, and setting the predetermined time period at a second value when the bit images correspond to a character.

* * * * *

UNITED STATES PATENT AND TRADEMARK OFFICE
CERTIFICATE OF CORRECTION

PATENT NO. : 4,996,649

DATED : February 26, 1991

INVENTOR(S) : Nobuo KAMEI and Yoshikazu IKENOUE

It is certified that error appears in the above-identified patent and that said Letters Patent is hereby corrected as shown below:

In Drawings please add Figs. 7, 10(a), 10(b), 11 and 12, copies of which are attached hereto.

Signed and Sealed this

Sixteenth Day of March, 1993

Attest:

STEPHEN G. KUNIN

*Attesting Officer*   Acting Commissioner of Patents and Trademarks